United States Patent
Aoyama et al.

(10) Patent No.: US 11,230,439 B2
(45) Date of Patent: Jan. 25, 2022

(54) FEEDING ROD FOR SHAFT-SHAPED COMPONENT AND FEEDING METHOD

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 0 days.

(21) Appl. No.: 17/045,278

(22) PCT Filed: Mar. 29, 2019

(86) PCT No.: PCT/JP2019/014139
§ 371 (c)(1),
(2) Date: Oct. 5, 2020

(87) PCT Pub. No.: WO2019/220793
PCT Pub. Date: Nov. 21, 2019

(65) Prior Publication Data
US 2021/0163233 A1    Jun. 3, 2021

(30) Foreign Application Priority Data

May 17, 2018  (JP) .............................. JP2018-107262

(51) Int. Cl.
*B23P 19/06* (2006.01)
*B23P 19/04* (2006.01)
(Continued)

(52) U.S. Cl.
CPC .............. *B65G 47/06* (2013.01); *B23P 19/06* (2013.01)

(58) Field of Classification Search
CPC .......... B23P 19/04; B23P 19/06; B65G 11/02; B65G 47/06
(Continued)

(56) References Cited

U.S. PATENT DOCUMENTS

| 5,035,039 A   | 7/1991  | Aoyama |         |
|---------------|---------|--------|---------|
| 5,074,742 A * | 12/1991 | Aoyama | B23Q 7/04 |
|               |         |        | 414/737 |

(Continued)

FOREIGN PATENT DOCUMENTS

| EP | 0 478 782 | 4/1992 |
|----|-----------|--------|
| JP | 2-52822   | 2/1990 |

(Continued)

OTHER PUBLICATIONS

International Search Report dated Jun. 18, 2019 in International (PCT) Application No. PCT/JP2019/014139.

(Continued)

*Primary Examiner* — Douglas A Hess
(74) *Attorney, Agent, or Firm* — Wenderoth, Lind & Ponack, L.L.P.

(57) ABSTRACT

A feeding rod is configured to insert a shaft-shaped component having a circular flange and a shaft portion into a receiving hole. A central axis of the shaft portion is disposed in an inclined state with respect to a central axis of the receiving hole due to the inclined disposition of the feeding rod. A surface of the flange is in close contact with a tip surface of the feeding rod due to an attraction force of a magnet of the feeding rod. A positioning protrusion receives an outer peripheral portion of the flange and sets a relative position between the feeding rod and the shaft-shaped component. A most advanced stop position of the feeding rod is a position where a tip portion of the shaft portion has entered the receiving hole, and the attraction force of the magnet is configured to be eliminated at the stop position.

2 Claims, 6 Drawing Sheets

(51) Int. Cl.
*B65G 11/02* (2006.01)
*B65G 47/06* (2006.01)

(58) Field of Classification Search
USPC .................................. 198/747; 29/445, 719
See application file for complete search history.

(56) References Cited

U.S. PATENT DOCUMENTS

| | | | |
|---|---|---|---|
| 5,191,691 A | 3/1993 | Aoyama | |
| 5,557,841 A * | 9/1996 | Aoyama | B23K 9/206 221/212 |
| 6,102,193 A * | 8/2000 | Rivers, Jr. | B23P 19/002 198/468.5 |
| 6,152,281 A * | 11/2000 | Bednarz | H05K 13/028 198/381 |
| 6,874,655 B2 * | 4/2005 | Aoyama | B23K 11/3081 221/213 |
| 7,896,194 B2 * | 3/2011 | Sakota | B23P 19/007 221/213 |
| 8,336,716 B2 * | 12/2012 | Aoyama | B23K 11/0053 209/660 |

FOREIGN PATENT DOCUMENTS

| | | |
|---|---|---|
| JP | 2-56305 | 2/1990 |
| JP | 2000-167730 | 6/2000 |
| JP | 2013-071240 | 4/2013 |
| JP | 2013-78835 | 5/2013 |

OTHER PUBLICATIONS

Notice of Reasons for Refusal dated Jul. 24, 2018 in corresponding Japanese Application No. 2018-107262 with English translation.
International Preliminary Report on Patentability and Written Opinion of The International Searching Authority dated Nov. 17, 2020 in International (PCT) Application No. PCT/JP2019/014139.
Extended European Search Report dated Aug. 16, 2021 in corresponding European Patent Application No. 19804163.4.

* cited by examiner

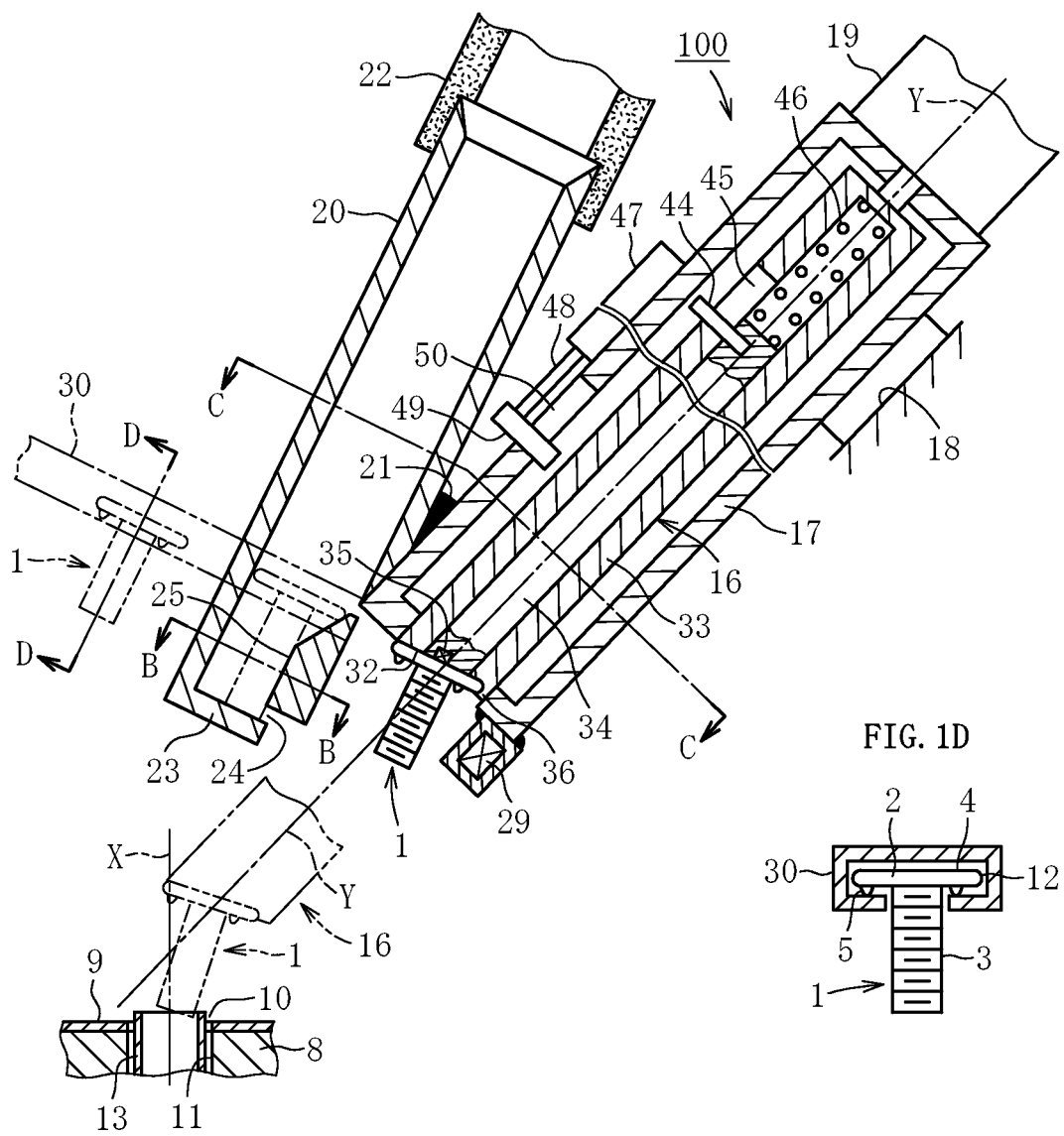
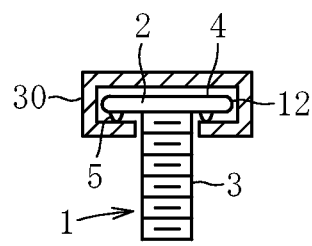
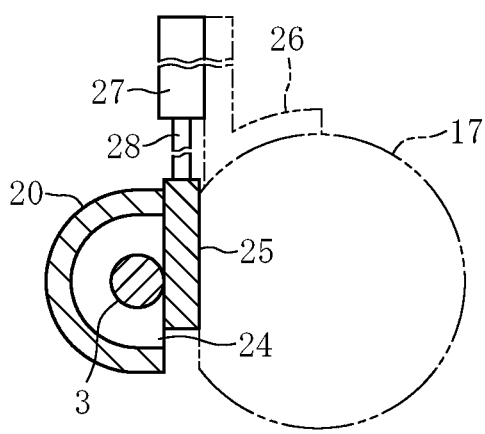
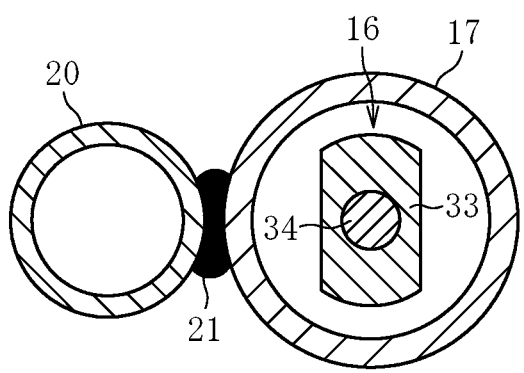

FIG. 3A
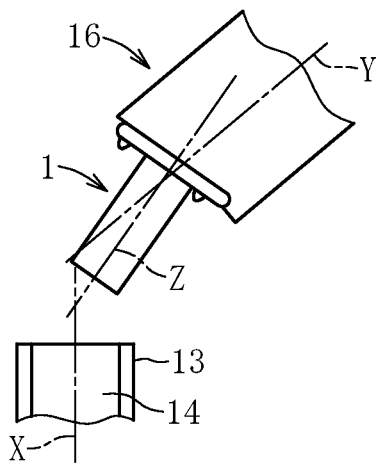
FIG. 3B
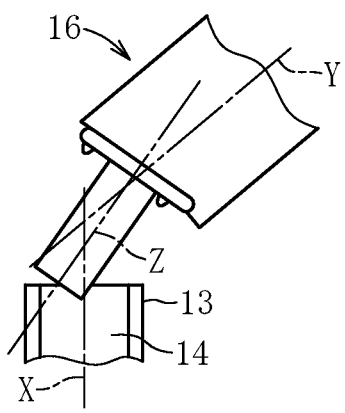
FIG. 3B1
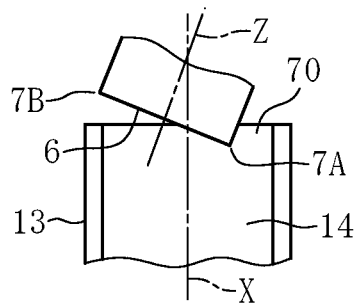
FIG. 3C
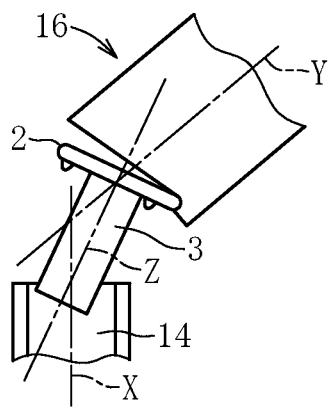
FIG. 3C1
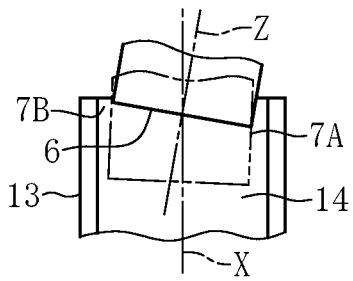
FIG. 3D
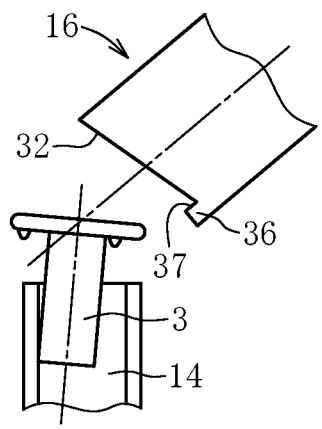
FIG. 3E
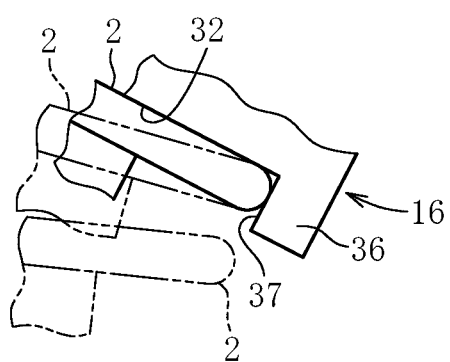
FIG. 3F
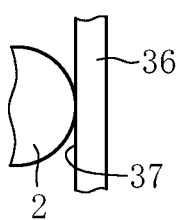

FEEDING ROD FOR SHAFT-SHAPED COMPONENT AND FEEDING METHOD

TECHNICAL FIELD

The present invention relates to a feeding rod and a feeding method intended for feeding a shaft-shaped component in which a circular flange and a shaft portion are integrated with each other.

BACKGROUND ART

A feeding rod described in JP H2-56305 A is intended for feeding a shaft-shaped component in which a circular flange and a shaft portion are integrated with each other. In this feeding rod, the flange is brought into close contact with a tip surface of the feeding rod having a projecting piece, and a tip portion of the shaft-shaped component is advanced to an upper position of a receiving hole as a destination. After that, the close contact of the flange is released, and the shaft-shaped component falls while the falling shaft-shaped component makes an arc movement centering on the projecting piece of the feeding rod, to be inserted into an opening as the destination.

Also, in JP H2-52822 A, similar matters to those of the feeding rod described in JP H2-56305 A are described.

CITATIONS LIST

Patent Literature

Patent Literature 1: JP H2-56305 A
Patent Literature 2: JP H2-52822 A

SUMMARY OF INVENTION

Technical Problems

As illustrated in FIG. 8, the feeding rods disclosed in Patent Literatures 1 and 2 are intended for feeding a shaft-shaped component 82 in which a circular flange 80 and a shaft portion 81 are integrated with each other, and an advanced stop position of a feeding rod 83 is a position where a tip of the shaft portion of the shaft-shaped component 82 reaches an upper position of a receiving hole 84. That is, when the advance of the feeding rod 83 is stopped, a space 85 exists between the tip of the shaft portion and an opening portion of the receiving hole. At this stop position, when an attraction force of a magnet 86 that attracts the shaft-shaped component 82 is eliminated, the shaft-shaped component 82 falls in the space 85 and is inserted into the receiving hole 84. The feeding rod 83 is disposed in an inclined posture, and a central axis Z of the shaft-shaped component 82 is also inclined with respect to a central axis X of the receiving hole 84 in a vertical direction.

The feeding rod 83 is generally supported by a bearing structure in such a manner that the feeding rod 83 can advance and retreat, and a tip position at the time of advance may fluctuate in a runout direction due to wear of a bearing sliding portion and changes in an oil film thickness of lubricating oil. Alternatively, vibrations due to peripheral devices or the like act on the feeding rod 83, which causes a deviation in the tip position at the time of the advance. If the shaft-shaped component 82 falls in the space 85 under such situations, there arises a problem that, if a relative position between the stop position of the tip of the shaft portion and the opening portion of the receiving hole is not maintained exactly as specified, the tip of the shaft portion hits a corner portion of the opening of the receiving hole 84, for example, and is not accurately inserted into the receiving hole 84.

In order to solve this problem, it is conceivable to make an inner diameter of the receiving hole 84 larger with respect to a diameter of the shaft portion 81. However, with this structure, an eccentric amount of the shaft portion 81 in a diameter direction of the receiving hole 84 is large, the central axis of the shaft-shaped component 82 is significantly displaced from the central axis of the receiving hole 84, and for example, in a case where the shaft-shaped component 82 is welded to a steel plate component, a welding position of the shaft-shaped component 82 is not determined uniformly. Furthermore, since the central axis Z falls in the space 85 while changing its direction to the vertical direction and enters the receiving hole 84, a large fluctuation in a falling trajectory occurs due to a runout displacement of a tip portion of the feeding rod or some vibration, which makes it impossible to insert the shaft portion 81 accurately. Therefore, it is necessary to make the inner diameter of the receiving hole 84 larger with respect to the diameter of the shaft portion 81. Also, in this respect, the problem of the eccentric amount arises.

The present invention is provided to solve the above-described problems, and an object thereof is to securely insert a shaft-shaped component held at a tip portion of a feeding rod into a receiving hole as a feeding destination, and to accurately obtain a relative position between the receiving hole and the shaft-shaped component in a diameter direction of the receiving hole.

Solutions to Problems

According to one aspect of the present invention, a feeding rod for shaft-shaped component is configured to hold a shaft-shaped component, in which a flange having a circular shape and a shaft portion are integrated with each other, at a tip portion of the feeding rod to feed the shaft-shaped component, so that the shaft portion of the shaft-shaped component is inserted into a receiving hole as a feeding destination, an advance and retreat axis of the feeding rod is disposed in an inclined state with respect to a central axis of the receiving hole disposed in a substantially vertical direction, a central axis of the shaft portion is disposed in an inclined state with respect to the central axis of the receiving hole due to disposition of the feeding rod, a surface of the flange is held by the feeding rod in close contact with a tip surface of the feeding rod by an attraction force of an advancing and retreating permanent magnet or electromagnet disposed in the feeding rod, a positioning protrusion that receives an outer peripheral portion of the flange and sets a relative position between the feeding rod and the shaft-shaped component is provided at a lowest position of the tip surface of the feeding rod due to inclination of the feeding rod, an advance length of the feeding rod is set so that a most advanced stop position of the feeding rod is a position where a tip portion of the shaft portion has entered the receiving hole, and the attraction force of the permanent magnet or the electromagnet is configured to be eliminated at the most advanced stop position.

Advantageous Effects of Invention

When the feeding rod is located at the most advanced stop position where the feeding rod has advanced most, the tip portion of the shaft portion has entered an opening portion of the receiving hole, and at the same time, the flange is received by the positioning protrusion provided at the lowest position of the tip surface of the feeding rod. When the attraction force of the permanent magnet or electromagnet to the shaft-shaped component is eliminated in this state, an initial arc movement is started with the outer peripheral portion of the flange in contact with the positioning protrusion. This movement allows the tip portion of the shaft portion to enter the opening portion of the receiving hole, and a positional relationship between the tip portion of the shaft portion and the receiving hole is set to an insertable state. The initial arc movement is transferred to a falling arc movement while the surface of the flange is separated from the tip surface of the feeding rod, and the shaft portion is inserted into the receiving hole while the central axis of the shaft portion approaches the vertical direction.

Although the central axis of the shaft portion is inclined with respect to the central axis of the receiving hole due to the inclined disposition of the feeding rod, the positional relationship between the tip portion of the shaft portion and the receiving hole is set to the insertable state by the initial arc movement, so that the tip of the shaft portion can be prevented from hitting a corner portion of the opening of the receiving hole. Furthermore, in the falling arc movement, the central axis of the shaft portion approaches the central axis of the receiving hole, which is the substantially vertical direction, so that the shaft portion is smoothly inserted into the receiving hole.

As described above, the positional relationship between the tip portion of the shaft portion and the receiving hole is set to be the insertable state by the initial arc movement, and the central axis of the shaft portion is in an upright state close to the vertical direction by the falling arc movement. Thus, even if a difference between a diameter dimension of the shaft portion and an inner diameter dimension of the receiving hole is small, the shaft portion can be inserted. Therefore, a displacement amount of the shaft-shaped component in a diameter direction of the receiving hole can be minimized, and a relative position between the shaft-shaped component and a member in which the receiving hole is formed can be accurately maintained.

Even if a runout displacement at the time of advance of the feeding rod is large, a part of a lower end of the shaft portion has entered the receiving hole, and a relative position between the shaft portion and the receiving hole is set to be the insertable state by the initial arc movement. Thus, the insertion of the shaft portion is securely performed from an initial stage, and the central axis of the shaft portion approaches the vertical direction at a stage of the falling arc movement to achieve smooth insertion.

Furthermore, since the advance of the feeding rod is stopped at a position where the tip portion of the shaft portion is inserted into the receiving hole, it is sufficient that the stop position is such that the insertion into the receiving hole is established. Therefore, even if the stop position of the feeding rod fluctuates back and forth, an arc moving operation can be performed without any trouble, and a highly reliable operation of the feeding rod can be ensured.

According to another aspect of the present invention, a feeding method for shaft-shaped component comprises holding a shaft-shaped component, in which a flange having a circular shape and a shaft portion are integrated with each other, at a tip portion of a feeding rod, and feeding the shaft-shaped component, so that the shaft portion of the shaft-shaped component is inserted into a receiving hole as a feeding destination, wherein an advance and retreat axis of the feeding rod is disposed in an inclined state with respect to a central axis of the receiving hole disposed in a substantially vertical direction, a central axis of the shaft portion is disposed in an inclined state with respect to the central axis of the receiving hole due to inclined disposition of the feeding rod, a surface of the flange is held by the feeding rod in close contact with a tip surface of the feeding rod by an attraction force of an advancing and retreating permanent magnet or electromagnet disposed in the feeding rod, a positioning protrusion that receives an outer peripheral portion of the flange and sets a relative position between the feeding rod and the shaft-shaped component is provided at a lowest position of the tip surface of the feeding rod due to inclination of the feeding rod, an advance length of the feeding rod is set so that a most advanced stop position of the feeding rod is a position where a tip portion of the shaft portion has entered the receiving hole, the attraction force of the permanent magnet or electromagnet is configured to be eliminated at the most advanced stop position, and an initial arc movement that is started in a state where the outer peripheral portion of the flange is in contact with the positioning protrusion by elimination of the attraction force of the permanent magnet or the electromagnet at the most advanced stop position of the feeding rod and a falling arc movement subsequent to the initial arc movement are performed.

Effects of the invention relating to the feeding method for shaft-shaped component are the same as the effect of the invention of the feeding rod for shaft-shaped component described above.

Note that the state where the tip portion of the shaft portion has entered the receiving hole or only a lower-side corner portion of the tip portion of the shaft portion has entered the opening portion of the receiving hole means a state where the tip portion or the lower-side corner portion of the tip portion of the shaft portion exists in an internal space of the receiving hole than a virtual plane at an opening end of the receiving hole.

BRIEF DESCRIPTION OF DRAWINGS

FIG. 1A is a sectional view of an entire device.

FIG. 1B is a sectional view taken along a line B-B of FIG. 1A.

FIG. 1C is a sectional view taken along a line C-C of FIG. 1A.

FIG. 1D is a sectional view taken along a line D-D of FIG. 1A.

FIG. 3A is a sectional view illustrating a process in which a bolt is inserted into a receiving hole.

FIG. 3B is a sectional view illustrating a process in which the bolt is inserted into the receiving hole.

FIG. 3B1 is an enlarged view of a local portion of FIG. 3B.

FIG. 3C is a sectional view illustrating a process in which the bolt is inserted into the receiving hole.

FIG. 3C1 is an enlarged view of a local portion of FIG. 3C.

FIG. 3D is a sectional view illustrating a process in which the bolt is inserted into the receiving hole.

FIG. 3E is a sectional view illustrating a process in which the bolt is inserted into the receiving hole.

FIG. 3F is a partial view illustrating a contact state between a flange and a positioning protrusion.

DESCRIPTION OF EMBODIMENT

Figure 2A:
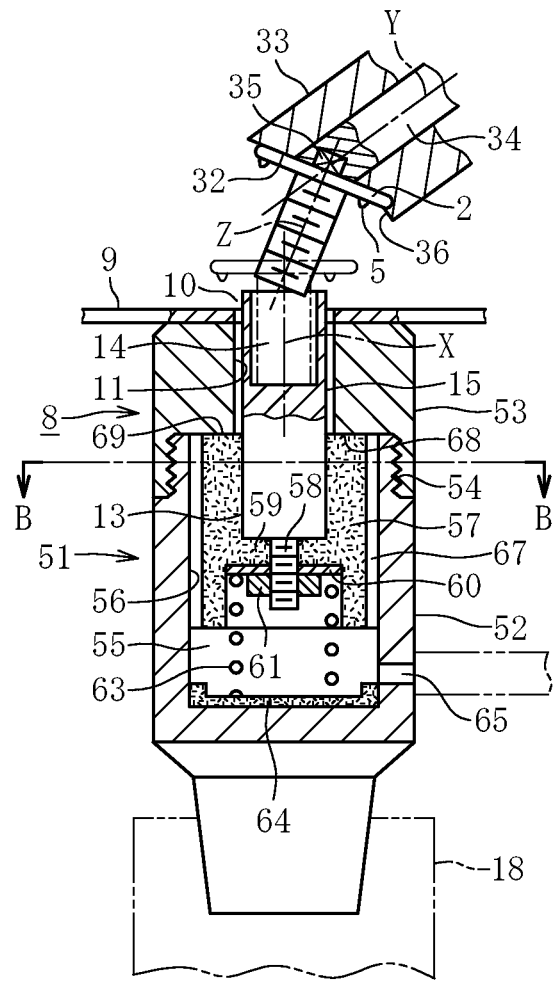
FIG. 2A is a sectional view of an electric resistance welding electrode.

Next, configurations for implementing a feeding rod for shaft-shaped component and a feeding method of the present invention will be described.

Embodiment

FIGS. 1A to 6 illustrate an embodiment of the present invention.

First, a shaft-shaped component will be described.

There are various types of shaft-shaped components such as a general bolt having a hexagonal head, a projection bolt having a flange, and a straight rod. Here, the projection bolt is to be fed. In the following description, "projection bolt" may be simply expressed as "bolt".

As illustrated in each drawing, a shaft-shaped component 1 is a projection bolt, in which a shaft portion 3 formed with a male screw is integrally provided at a center of a circular flange 2. A flange surface on a side opposite to the shaft portion 3 is a flat circular surface 4, and three welding protrusions 5 are provided on a back surface at intervals of 120 degrees. The bolt 1 is made of iron, which is a magnetic material. An outer peripheral portion of the flange 2 is indicated by a reference numeral 12, and in a case of illustration, the outer peripheral portion of the flange 2 has a rounded shape (arc shape) over the entire circumference. Regarding a dimension of each part of the projection bolt 1 as the shaft-shaped component, a diameter and a thickness of the flange 2 are 12 mm and 3 mm, respectively, and a length and a diameter of the shaft portion are 13 mm and 8 mm, respectively. Note that the bolt is also given a reference numeral 1.

Next, an entire device will be described.

The device here is a bolt feeding device and is indicated by a reference numeral 100. In a case of illustration, a steel plate component 9 is placed on a fixed electrode 8, and the bolt 1 is welded to the steel plate component 9. When a hollow guide pin 13 is inserted in a guide hole 11 of the fixed electrode 8 and the steel plate component 9 is placed on the fixed electrode 8, the guide pin 13 penetrates a prepared hole 10 of the steel plate component 9 so that a relative position between the steel plate component 9 and the fixed electrode 8 is set.

A destination of feeding of the shaft portion 3 is a receiving hole 14, and a hollow space portion of the guide pin 13 is the receiving hole 14. A central axis X of the receiving hole 14 is disposed in a substantially vertical direction. Although not illustrated, an opening formed in a counterpart component such as a block-shaped component may be the receiving hole 14, and the shaft portion 3 may be inserted thereinto. Note that an illustration of an advancing and retreating movable electrode paired with the fixed electrode 8 in a coaxial state is omitted.

A feeding rod 16 that advances and retreats obliquely downward is housed in an outer cylinder 17 having a circular cross section, and the outer cylinder 17 is fixed to a stationary member 18 such as a machine frame of the device 100. The feeding rod 16 advances and retreats by an advance and retreat output of an air cylinder 19 connected to the outer cylinder 17. This advance and retreat direction is such that the feeding rod 16 advances obliquely downward and returns. A central axis Y of the feeding rod 16 is disposed in an inclined direction with respect to the central axis X of the receiving hole 14. Furthermore, a central axis Z of the shaft portion 3 also intersects the central axis X of the receiving hole 14.

A holding structure for holding the bolt 1 is disposed at a tip portion of the feeding rod 16. Although a detailed structure of this holding structure will be described later, the bolt 1 that has passed through a feeding passage means of the bolt 1 is held by the holding structure at the tip portion of the feeding rod 16.

As the feeding passage means of the bolt 1, various feeding passages can be employed such as a feeding passage in which the bolt 1 stopped at an end portion of a feeding pipe is transferred to the feeding rod 16 to be held, and a feeding passage in which the bolt 1 is transferred in a suspended state by a guide rail disposed in a substantially horizontal direction to be held. Here, a feeding pipe 20 shown by a solid line in FIG. 1A is employed.

A longitudinal direction of the feeding pipe 20 forms an acute angle with the central axis Y. The feeding pipe 20 is integrated with the outer cylinder 17 by a welded portion 21 filled in black. A synthetic resin feeding hose 22 joined to the feeding pipe 20 extends from a parts feeder (not illustrated).

The feeding pipe 20 has a circular cross section, and a stopper member 23 is formed at an end of the feeding pipe 20, and an outlet opening 24 is provided in a lower portion of the feeding pipe 20 in order to transfer the bolt 1 stopped by the stopper member 23 toward the holding structure disposed at the tip portion of the feeding rod 16. An openable gate member 25 is provided for temporarily locking the bolt 1 that has reached the stopper member 23.

A method of advancing and retreating the gate member 25 is illustrated in FIG. 1B, in which an air cylinder 27 is fixed to a bracket 26 connected to the outer cylinder 17, and the gate member 25 is connected to a piston rod 28 of the air cylinder 27.

A magnet 29 is fixed to an end portion of the outer cylinder 17, and when the gate member 25 is opened, the bolt 1 is vigorously transferred toward the holding structure through the outlet opening 24 by an attraction force of the magnet 29. Meanwhile, as shown by a two-dot chain line in FIG. 1A and as illustrated in FIG. 1D, when the bolt 1 is vigorously transferred along a guide rail 30 in a substantially horizontal direction in a suspended state (a hung state), the bolt 1 reaches the holding structure at high speed. Therefore, in the case of the guide rail 30, the magnet 29 can be omitted. Alternatively, the magnet 29 can be omitted even when the central axis Y in FIG. 1A is further inclined and the bolt 1 is transferred in a state of falling toward the holding structure. For this reason, in the present invention, presence of the magnet 29 is arbitrary. Note that, as illustrated in FIG. 1A, the magnet 29 is housed in a container made of stainless steel, which is a non-magnetic material, and this container is welded to the end portion of the outer cylinder 17.

Next, the holding structure will be described.

The holding structure is a structure for securely holding the bolt 1 at a predetermined position on the tip portion of the feeding rod 16 and inserting the bolt 1 into the receiving hole 14, which is the destination, after the feeding rod 16 advances.

Figure 2B:
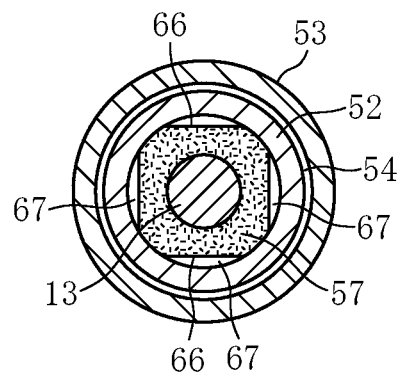
FIG. 2B is a sectional view taken along a line B-B of FIG. 2A.

Since illustration in FIGS. 2A and 2B is easy to see, description will be made mainly in accordance with these drawings. A tip surface 32 with which the surface 4 of the flange 2 is in close contact is formed at the tip portion of the feeding rod 16. In the feeding rod 16, an inner shaft 34 is inserted in a hollow shaft 33 having a hollow tubular shape in a state where the inner shaft 34 can advance and retreat. The tip surface 32 is formed by arranging an end surface of the hollow shaft 33 and an end surface of the inner shaft 34 on one virtual plane. The flat tip surface 32 is inclined with respect to the central axis Y of the feeding rod 16. Therefore, the central axis Y of the feeding rod 16 and the central axis Z of the shaft portion 3 intersect.

The close contact of the surface 4 of the flange 2 with the tip surface 32 is achieved by an advancing and retreating permanent magnet 35 disposed in the feeding rod 16. Here, the permanent magnet 35 is attached so as to be embedded in an end portion of the inner shaft 34. An end surface of the permanent magnet 35 is also arranged on the virtual plane to form a part of the tip surface 32. Instead of exposing the permanent magnet 35 in this way, a surface of the permanent magnet 35 may be covered with a cover plate so that a surface of the cover plate forms a part of the tip surface 32.

Figure 6:
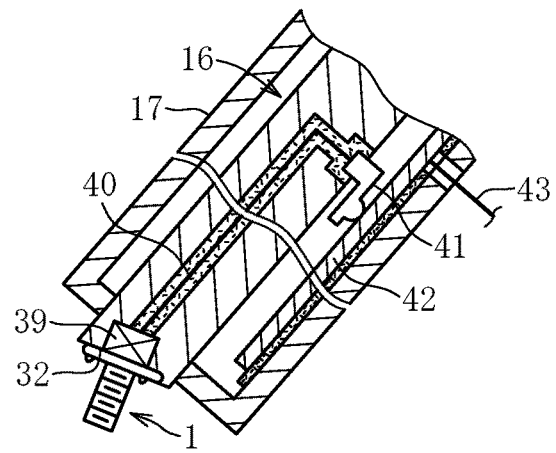
FIG. 6 is a sectional view illustrating an example of an electromagnet type.

Instead of the permanent magnet 35, an electromagnet 39 can be employed, as illustrated in FIG. 6. The electromagnet 39 is attached in a state of being embedded in the feeding rod 16, and a conducting wire 40 in the feeding rod 16 is connected to an energization sliding member 41 fixed to the feeding rod 16. An elongated energization stationary member 42 is attached to an inner surface of the outer cylinder 17, and the energization sliding member 41 is in contact with the energization stationary member 42. The energization stationary member 42 is set to have a length necessary for an advance stroke described later, and a conducting wire 43 extending from a power source is connected to the energization stationary member 42. Various methods can be employed as a method of stopping energization for eliminating an attraction force of the electromagnet 39, and it is convenient to use a signal from a sensor that operates in a predetermined stroke.

Since the feeding rod 16 is disposed in an inclined state, the tip surface 32 of the feeding rod 16 is also inclined. A positioning protrusion 36 is provided at a lowest position, which is the lowest position of the tip surface 32. The positioning protrusion 36 is disposed on a lower side of the inclination of the feeding rod 16, that is, a lower side of the central axis Y, and extends from the hollow shaft 33. The positioning protrusion 36 is formed with a receiving surface 37 that receives an outer peripheral portion 12 of the flange 2. The receiving surface 37 is a flat surface and is disposed in a direction perpendicular to a paper surface of FIG. 4A. The positioning protrusion 36 sets a relative position between the feeding rod 16 and the shaft-shaped component 1 when the outer peripheral portion 12 of the flange 2 is received by the receiving surface 37. That is, the positioning protrusion 36 receives the outer peripheral portion 12 of the flange 2 at the lowest position of the tip surface 32 due to the inclination of the feeding rod 16, and sets the relative position between the feeding rod 16 and the shaft-shaped component 1. Note that, in order to make an attraction force of the permanent magnet 35 act stronger on the bolt 1, the hollow shaft 33 is constituted of a non-magnetic material, and the positioning protrusion 36 is also made of a non-magnetic material.

Next, an advance and retreat structure of the permanent magnet will be described.

The permanent magnet 35 is separated from the flange 2 to substantially eliminate the attraction force to the bolt 1. As a structure for this purpose, various structures can be employed such as a structure in which a thin rod is connected to the permanent magnet 35 and the rod is advanced and retreated to move the permanent magnet 35 away from the flange 2, and a structure in which an air cylinder is connected to the end portion of the inner shaft 34 to advance and retreat the inner shaft 34. Here, the latter, that is, a type of advancing and retreating inner shaft is employed.

As described above, in the feeding rod 16, the inner shaft 34 is inserted in the hollow shaft 33 having a hollow tubular shape in a state where the inner shaft 34 can advance and retreat, and a restriction pin 44 fitted to the inner shaft 34 projects into the outer cylinder 17 through a long hole 45 formed in the hollow shaft 33. A compression coil spring 46 is interposed between an upper end portion of the inner shaft 34 and an inner end surface of the hollow shaft 33, and tension of the compression coil spring 46 acts in a direction to push out the inner shaft 34, and the restriction pin 44 abuts against a lower end of the long hole 45 by this tension. In this state, the tip surface 32 forms a flat attachment surface.

An air cylinder 47, which is a driving means, is fixed to an outer surface of the outer cylinder 17, an engagement piece 49 is connected to a piston rod 48 of the air cylinder 47, and the engagement piece 49 penetrates through a long hole 50 formed in the outer cylinder 17 and projects into the outer cylinder 17. A relative position between the engagement piece 49 and the restriction pin 44 is set so that the restriction pin 44 can face the engagement piece 49 when the feeding rod 16 moves at a stroke of a predetermined length.

The bolt 1 transferred from the feeding hose 22 to the feeding pipe 20 hits the stopper member 23 to be stopped, and becomes stationary by the gate member 25 in a closed position. Then, when the gate member 25 is opened by an operation of the air cylinder 27, the bolt 1 is transferred in an upright state in a substantially horizontal direction by the attraction force of the magnet 29, and the flange 2 reaches a vicinity of the tip surface 32. Furthermore, the flange 2 advances toward the receiving surface 37 of the positioning protrusion 36, the outer peripheral portion 12 of the flange 2 is received by the receiving surface 37, and the surface 4 of the flange 2 is attracted to and in close contact with the tip surface 32 by the attraction force of the permanent magnet 35 at an advanced position.

After that, an operation of the air cylinder 19 causes the feeding rod 16 to advance over a predetermined length and stop at a most advanced position. That is, the feeding rod 16 is stopped at a most advanced stop position of the feeding rod 16. At this time, a tip portion of the shaft portion 3 has entered the receiving hole 14, as described later. At this stage, the restriction pin 44 is stopped just before the engagement piece 49. Then, when the engagement piece 49 hits the restriction pin 44 by a contraction operation of the air cylinder 47, the inner shaft 34 retreats while compressing the compression coil spring 46. By this retreat, the permanent magnet 35 also retreats, and the attraction force to the bolt 1 is eliminated.

Next, the electric resistance welding electrode will be described.

The illustrated electric resistance welding electrode is the fixed electrode indicated by the above-described reference numeral 8. An electrode body 51 made of a conductive metal material made of a copper alloy such as chrome copper has a cylindrical shape and has a circular cross section, and a fixing portion 52 that is inserted in the stationary member 18 and a cap portion 53 on which the steel plate component 9 is placed are connected by a screw portion 54. A guide hole 55 having a circular cross section is formed in the electrode body 51, and the guide hole 55 includes a large-diameter hole 56 formed in the fixing portion 52 and a small-diameter hole 11 (guide hole 11 described above) formed in the cap portion 53 and having a smaller diameter than the large-diameter hole 56. Hereinafter, a reference numeral 11 is given to both the small-diameter hole and the guide hole.

The guide pin 13 having a circular cross section projects from an end surface of the electrode body 51 on which the steel plate component 9 is placed, and penetrates the prepared hole 10 of the steel plate component 9. The guide pin 13 is constituted of a heat resistant hard material such as a metal material such as stainless steel or a ceramic material.

Furthermore, as described later, a sliding member 57 having a circular cross section that advances and retreats in a sliding state with respect to the large-diameter hole 56 is constituted of an insulating synthetic resin material having excellent heat resistance, for example, polytetrafluoroethylene (trade name: Teflon (registered trademark)). It is also possible to employ, from polyamide resins, a resin having excellent heat resistance and abrasion resistance, as another material.

The guide pin 13 is inserted in a center of the sliding member 57 so that the guide pin 13 and the sliding member 57 are integrated. As a structure for integrating the guide pin 13 with the sliding member 57, various methods can be employed such as a method of molding the guide pin 13 together at the time of injection molding of the sliding member 57 and a method of providing a connecting bolt structure portion on the guide pin 13. Here, the latter, that is, a type of connecting bolt structure portion is employed.

That is, a bolt 58 is formed integrally with a lower end portion of the guide pin 13, and penetrates a bottom member 59 of the sliding member 57, a washer 60 is mounted, and the bolt 58 is tightened with a lock nut 61. The sliding member 57 performs an insulating function so that when the movable electrode paired with the fixed electrode 8 operates and a welding current is applied, the current flows from the welding protrusions 5 of the bolt 1 only to the steel plate component 9.

A compression coil spring 63 is fitted between the washer 60 and an inner bottom surface of the guide hole 55, and tension of the compression coil spring 63 acts on the sliding member 57. Note that a reference numeral 64 indicates an insulating sheet fitted to an inner bottom surface of a guide hole 6. The tension of the compression coil spring 63 establishes pressure contact of a movable end surface with a stationary inner end surface, which will be described later. The compression coil spring 63 is a pressurizing means, and it is also possible to use a pressure of compressed air instead of the compression coil spring 63.

A ventilation gap 15 is formed between the small-diameter hole 11 and the guide pin 13, and cooling air flows through the gap 15 when the guide pin 13 is pushed down.

A ventilation port 65 that guides the cooling air to the guide hole 55 is formed in the fixing portion 52. In order to secure an air passage in a sliding portion between the large-diameter hole 56 and the sliding member 57, a recessed groove in a direction of the central axis X can be formed on an outer peripheral surface of the sliding member 57. However, here, as illustrated in FIG. 2B, a flat portion 66 in the direction of the central axis X is formed on the outer peripheral surface of the sliding member 57, so that an air passage 67 formed by the flat portion 66 and a circular-shaped inner surface of the large-diameter hole 56 is formed. Such flat portions 66 are formed at intervals of 90 degrees to provide the air passages 67 at four places.

An annular stationary inner end surface 68 is formed at a boundary between the large-diameter hole 56 and the small-diameter hole 11 of the guide hole 55. Furthermore, an annular movable end surface 69 is formed on an upper surface of the sliding member 57. The stationary inner end surface 68 and the movable end surface 69 are disposed on a virtual plane to which a central axis of the electrode body 51 (the central axis X of the receiving hole 14) intersects perpendicularly. The movable end surface 69 is in close contact with the stationary inner end surface 68 by the tension of the compression coil spring 63 in an annular state, and a cooling air flow is sealed by this contact.

In the bolt 1 inserted into the receiving hole 14, the shaft portion 3 abuts against an inner bottom surface of the receiving hole 14. Here, when the flange 2 is pushed down by advance of the movable electrode, the guide pin 13 retreats while compressing the compression coil spring 63, and the welding protrusions 5 are pressed against the steel plate component 9. After that, the welding current is applied to weld the bolt 1 to the steel plate component 9. At this time, the movable end surface 69 is separated from the stationary inner end surface 68 to circulate the cooling air.

Next, a stop position of the tip portion of the shaft portion will be described.

An advance length of the feeding rod 16 is set so that the most advanced stop position of the feeding rod 16 is a position where the tip portion of the shaft portion 3 has entered the receiving hole 14. FIG. 3A illustrates a state where the tip portion of the shaft portion 3 has advanced above the receiving hole 14. When the tip portion of the shaft portion 3 further advances, as illustrated in FIGS. 3B and 3B1, the tip portion of the shaft portion 3 enters the receiving hole 14.

Since the shaft portion 3 is inclined, a flat lower end surface 6 of the shaft portion 3 is also inclined, which forms a lower-side corner portion 7A and a higher-side corner portion 7B. A corner portion of the lower end surface 6 is annular, and a lowest position thereof is the lower-side corner portion 7A, and a highest position thereof is the higher-side corner portion 7B. As illustrated in FIG. 3B1, in a state where the tip portion of the shaft portion 3 has entered the receiving hole 14, only the lower-side corner portion 7A has entered the receiving hole 14 and the higher-side corner portion 7B does not enter the receiving hole 14. That is, the higher-side corner portion 7B is displaced from an opening circle of the receiving hole 14 in a diameter direction, so that a space portion 70 is formed between the lower-side corner portion 7A and an inner surface of the receiving hole 14. In other words, the higher-side corner portion 7B is in a state of being displaced in the diameter direction from the receiving hole opening, that is, in a state of protruding from the receiving hole opening. Therefore, the higher-side corner portion 7B moves in an arc during an initial arc movement described later, and a relative position between the shaft portion 3 and the receiving hole 14 is set to an insertable state. When seen in a plan view, the higher-side corner portion 7B is displaced outward from the opening circle of the receiving hole 14, the lower-side corner portion 7A is located inside the opening circle, and the space portion 70 is formed between the lower-side corner portion 7A and the inner surface of the receiving hole 14.

Note that the state where the tip portion of the shaft portion 3 has entered the receiving hole 14 or only the lower-side corner portion 7A of the tip portion of the shaft portion 3 has entered an opening portion of the receiving hole means, as described above, a state where the tip portion of the shaft portion 3 or the lower-side corner portion 7A exists in an internal space of the receiving hole than a virtual plane at an opening end of the receiving hole. Therefore, as illustrated in FIGS. 3B and 3B1, the tip portion of the shaft portion 3 is not in contact with the opening circle of the receiving hole 14 over the entire circumference.

Next, the initial arc movement and a falling arc movement will be described.

Figure 4A:
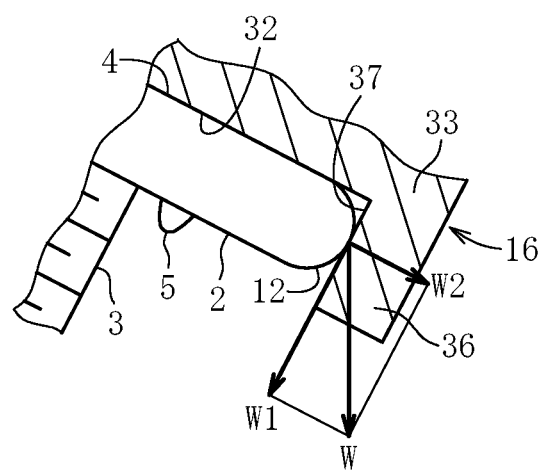
FIG. 4A is a sectional view illustrating a positional relationship between the flange and the positioning protrusion.

As illustrated in FIG. 4A, the receiving surface 37 is in a state of receiving the outer peripheral portion 12 of the flange 2 from a lower side because the feeding rod 16 is inclined. Therefore, since a load W of the bolt 1 is decomposed into a load component W1 and a load component W2 at a moment when the attraction force of the permanent magnet 35 or the electromagnet 39 is eliminated, a contact position between the outer peripheral portion 12 and the receiving surface 37 is not displaced due to the load component W2 of these components so that the contact state is maintained. Since the attraction force of the permanent magnet 35 or the electromagnet 39 is eliminated in this state, a position where the outer peripheral portion 12 of the flange 2 is in contact with the receiving surface 37 serves as a fulcrum, and the entire bolt 1 moves in an arc, as illustrated in FIG. 3C. This movement is the initial arc movement. During this initial arc movement, the space portion 70 becomes narrower, and along with this, the higher-side corner portion 7B moves inside the opening circle of the receiving hole 14, so that a positional relationship between the tip portion of the shaft portion and the receiving hole 14 is set to the insertable state. That is, a state shown by a solid line in FIG. 3C1 is obtained.

As illustrated in FIG. 3D, subsequent to the initial arc movement, while the outer peripheral portion 12 is separated from the receiving surface 37 and moves in an arc, the shaft portion 3 is displaced so as to approach a vertical direction. This is the falling arc movement. As illustrated in FIG. 3E, a position of the flange shown by a solid line illustrates a state where the flange is in close contact with the tip surface 32, a position shown by a next two-dot chain line illustrates the initial arc movement, and a position shown by a further next two-dot chain line illustrates the falling arc movement. The shaft portion 3 is inserted into the receiving hole 14 while approaching the vertical direction.

Figure 4B:
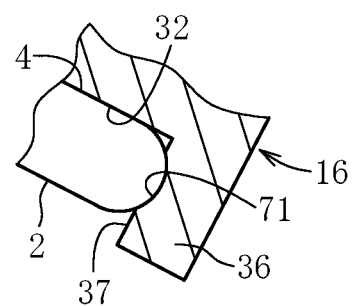
FIG. 4B is a sectional view illustrating a modified example of a receiving surface.

FIG. 4B is an example in which a recessed groove 71 is formed on the receiving surface 37 and the outer peripheral portion 12 is fitted thereto. With this structure, the movement fulcrum of the initial arc movement is prevented from being displaced downward.

Note that FIGS. 3A to 3F, FIG. 3B1, and FIG. 3C1 are not hatched for the sake of clarity.

Next, an example in which the stop position of the tip portion of the shaft portion is modified will be described.

Figure 5A:
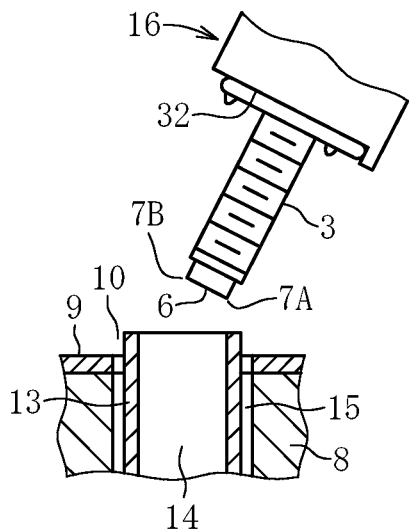
FIG. 5A is a sectional view illustrating stepwise another insertion mode.
Figure 5B:
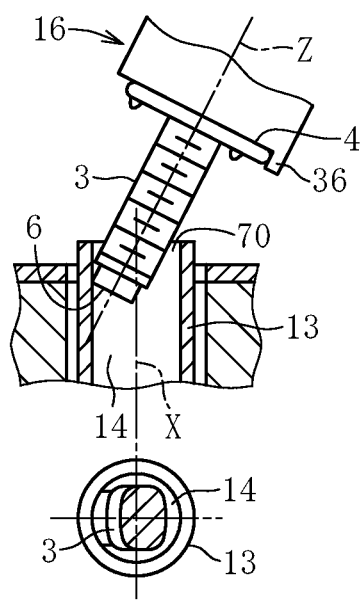
FIG. 5B is a sectional view illustrating stepwise another insertion mode.
Figure 5C:
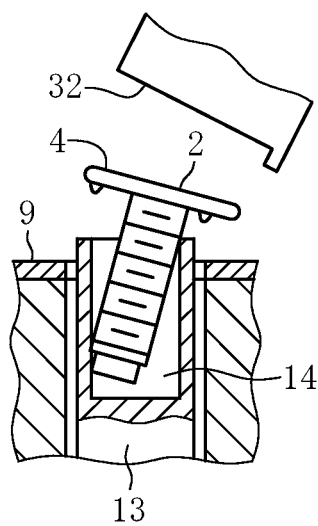
FIG. 5C is a sectional view illustrating stepwise another insertion mode.
Figure 5D:
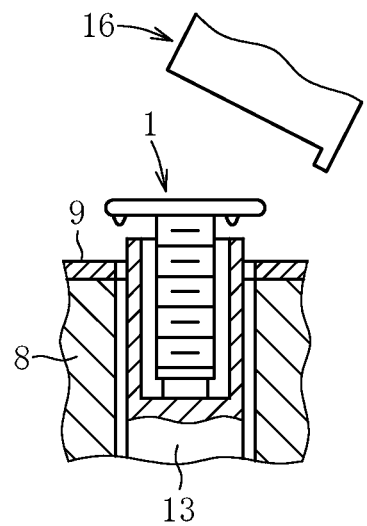
FIG. 5D is a sectional view illustrating stepwise another insertion mode.

As illustrated in FIG. 5B, the most advanced stop position of the feeding rod 16 is a state where the entire tip portion of the shaft portion 3 has entered the receiving hole 14. In this case, the higher-side corner portion 7B of the shaft portion 3 is in contact with the inner surface of the receiving hole 14 on a side opposite to an inclination direction of the feeding rod 16, to form the space portion 70 as described above.

Instead of the various air cylinders described above, it is possible to employ an electric motor that outputs advance and retreat. Furthermore, illustration of a supply and discharge pipe of working air connected to each air cylinder is omitted.

The operation of the advancing and retreating air cylinder 19 of the feeding rod 16 and the operation of the advancing and retreating air cylinder 47 of the engagement piece 49 can be easily performed by a generally employed control method. An air switching valve that operates with a signal from a control device or a sequence circuit, a sensor that emits a signal at a predetermined position of the air cylinder and transmits the signal to the control device, and the like are combined, so that a predetermined operation can be ensured.

The effects of the embodiment described above are as follows.

When the feeding rod 16 is located at the most advanced stop position where the feeding rod 16 has advanced most, the tip portion of the shaft portion 3 has entered the opening portion of the receiving hole, and at the same time, the flange 2 is received by the positioning protrusion 36 provided at the lowest position of the tip surface of the feeding rod. When the attraction force of the permanent magnet 35 or the electromagnet 39 to the bolt 1 is eliminated in this state, the initial arc movement is started with the flange outer peripheral portion 12 in contact with the positioning protrusion 36. This movement allows the tip portion of the shaft portion to enter the receiving hole opening portion, and the positional relationship between the tip portion of the shaft portion and the receiving hole 14 is set to the insertable state. The initial arc movement is transferred to the falling arc movement while the surface 4 of the flange 2 is separated from the feeding rod tip surface 32, and the shaft portion 3 is inserted into the receiving hole 14 while the central axis Z of the shaft portion 3 approaches the vertical direction.

Although the central axis Z of the shaft portion 3 is inclined with respect to the central axis X of the receiving hole 14 due to the inclined disposition of the feeding rod 16, the positional relationship between the tip portion of the shaft portion and the receiving hole 14 is set to the insertable state by the initial arc movement, so that the tip of the shaft portion can be prevented from hitting a corner portion of the opening of the receiving hole 14. Furthermore, in the falling arc movement, the central axis Z of the shaft portion 3 approaches the central axis X of the receiving hole 14, which is the substantially vertical direction, so that the shaft portion 3 is smoothly inserted into the receiving hole 14.

As described above, the positional relationship between the tip portion of the shaft portion and the receiving hole 14 is set to be the insertable state by the initial arc movement, and the central axis Z of the shaft portion 3 is in the upright state close to the vertical direction by the falling arc movement. Thus, even if a difference between a diameter dimension of the shaft portion 3 and an inner diameter dimension of the receiving hole 14 is small, the shaft portion 3 can be inserted. Therefore, a displacement amount of the bolt 1 in the diameter direction of the receiving hole 14 can be minimized, and a relative position between the bolt 1 and a member on which the receiving hole 14 is formed can be accurately maintained.

Even if a runout displacement at the time of advance of the feeding rod 16 is large, a part of a lower end of the shaft portion has entered the receiving hole 14, and the relative position between the shaft portion 3 and the receiving hole 14 is set to be insertable by the initial arc movement. Thus, the insertion of the shaft portion 3 is securely performed from an initial stage, and the central axis Z of the shaft portion 3 approaches the vertical direction at a stage of the falling arc movement to achieve smooth insertion.

Furthermore, since the advance of the feeding rod 16 is stopped at a position where the tip portion of the shaft portion 3 is inserted into the receiving hole 14, it is sufficient that the stop position is such that the insertion into the receiving hole 14 is established. Therefore, even if the stop position of the feeding rod 16 fluctuates back and forth, an arc moving operation can be performed without any trouble, and a highly reliable operation of the feeding rod 16 can be ensured.

Since the bolt shaft portion 3 is inserted into the receiving hole 14 provided on the hollow guide pin 13 of the electric resistance welding electrode, a displacement amount of the shaft portion 3 with respect to the guide pin 13 in the diameter direction is minimized. As a result, a relative position between the shaft portion 3 and the steel plate component 9 placed on the electrode can be accurately set.

Figure 8:
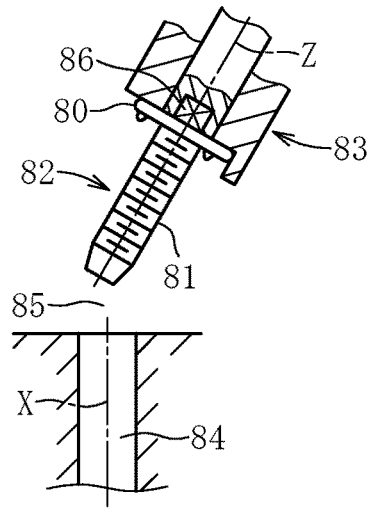
FIG. 8 is a sectional view of a conventional example.

The advance length of the feeding rod 16 is set so that the most advanced stop position of the feeding rod 16 is the position where the tip portion of the shaft portion 3 has entered the receiving hole 14. Here, the position state where the tip portion of the shaft portion 3 has entered the receiving hole 14 is shifted to a state where only the lower-side corner portion 7A of the tip portion of the shaft portion 3 has entered the opening portion of the receiving hole, and the higher-side corner portion 7B is displaced from the receiving hole opening in the diameter direction, so that it is possible to make the diameter of the shaft portion as close as possible to the inner diameter of the receiving hole. In other words, even if the higher-side corner portion 7B is in a state of being displaced in the diameter direction from the opening circle of the receiving hole, that is, in a state of protruding from the opening circle of the receiving hole, the higher-side corner portion 7B moves in an arc while narrowing the space portion 70 during the initial arc movement, and the relative position between the shaft portion 3 and the receiving hole 14 is set to the insertable state. Therefore, a gap between the shaft portion 3 and the inner surface of the receiving hole 14 can be minimized, and the relative position between the bolt 1 and the member on which the receiving hole 14 is formed can be accurately maintained. The shaft portion 3 of the bolt 1 having the above-described dimension of each part forms an annular gap between the shaft portion 3 and the inner surface of the receiving hole 14, a dimension of this gap is 0.5 mm, and it is determined that an eccentric amount of the shaft portion 3 can be minimized. According to a method of a conventional example illustrated in FIG. 8, it is estimated that a gap dimension of the bolt having the above-described dimension of each part needs to be 0.8 to 1.0 mm.

Figure 7:
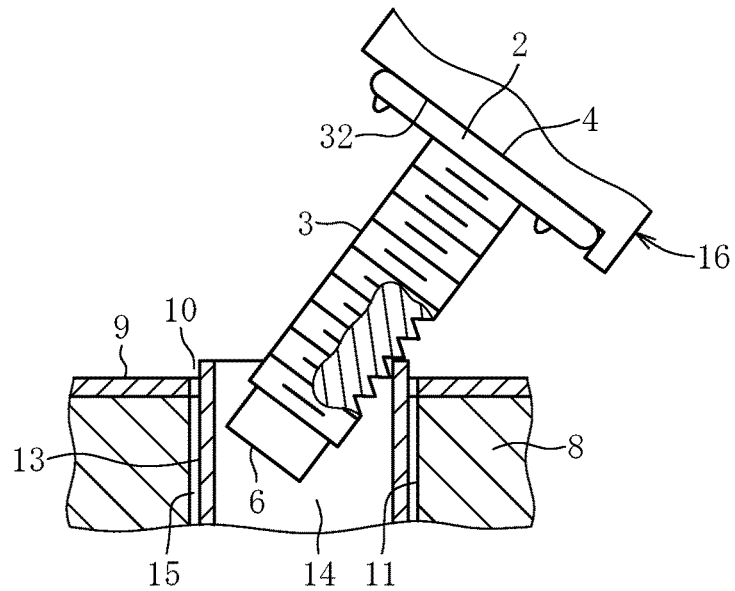
FIG. 7 is a sectional view illustrating a positional relationship between a male screw portion and the receiving hole.

As illustrated in FIG. 7, if a thread portion of the shaft portion 3 is caught on an edge portion of the opening of the receiving hole 14, there may be a case where the shaft portion 3 cannot be inserted into the receiving hole 14. The space portion 70 illustrated in FIGS. 3B and 3B1 or an insertion position of the shaft portion illustrated in FIG. 5B makes it possible to prevent the thread portion from being caught on the edge portion of the opening edge portion of the receiving hole 14.

Effects of an embodiment regarding the feeding method for the shaft-shaped component are the same as the effects of the embodiment of the feeding rod for the shaft-shaped component.

INDUSTRIAL APPLICABILITY

As described above, according to a feeding rod and a feeding method of the present invention, it is possible to securely insert a shaft-shaped component held at a tip portion of the feeding rod into a receiving hole as a feeding destination, and to accurately obtain a relative position between the receiving hole and the shaft-shaped component in a diameter direction of the receiving hole. Therefore, it is expected to be widely used in a car body welding process of automobiles, a sheet metal welding process of home appliances, and the like.

REFERENCE SIGNS LIST

1 Shaft-shaped component, projection bolt
2 Flange
3 Shaft portion
4 Surface
6 Lower end surface
7A Lower-side corner portion
7B Higher-side corner portion
8 Fixed electrode
9 Steel plate component
10 Prepared hole
11 Small-diameter hole, guide hole
12 Outer peripheral portion
13 Guide pin
14 Receiving hole
16 Feeding rod
32 Tip surface
35 Permanent magnet
36 Positioning protrusion
37 Receiving surface
39 Electromagnet
70 Space portion
100 Bolt feeding device
X Central axis of receiving hole
Y Central axis of feeding rod
Z Central axis of shaft portion

The invention claimed is:

1. A feeding rod for holding a shaft-shaped component having a flange with a circular shape and a shaft portion that are integrated with each other, the feeding rod comprising:
a tip portion configured to feed the shaft-shaped component, so that the shaft portion of the shaft-shaped component is inserted into a receiving hole as a feeding destination, wherein
an advance and retreat axis of the feeding rod is disposed in an inclined state with respect to a central axis of the receiving hole disposed in a substantially vertical direction,
a central axis of the shaft portion is disposed in an inclined state with respect to the central axis of the receiving hole due to inclined disposition of the feeding rod,
a surface of the flange is held by the feeding rod in close contact with a tip surface of the feeding rod by an attraction force of an advancing and retreating permanent magnet or electromagnet disposed in the feeding rod, the tip surface includes a positioning protrusion that receives an outer peripheral portion of the flange and sets a relative position between the feeding rod and the shaft-shaped component, the positioning protrusion being provided at a lowest position of the tip surface of the feeding rod due to inclination of the feeding rod, an advance length of the feeding rod is set so that a most advanced stop position of the feeding rod is a position where a tip portion of the shaft portion has entered the receiving hole, the attraction force of the advancing and retreating permanent magnet or electromagnet is configured to be eliminated at the most advanced stop position, and the outer peripheral portion of the flange has an arc shape in a longitudinal section of the flange along the central axis of the shaft portion, and the positioning protrusion has a receiving surface formed with a recessed groove to which the outer peripheral portion of the flange is fitted, so that, when the attraction force is eliminated, the shaft-shaped component performs an initial arc movement with a contact position between the outer peripheral portion of the flange and the recessed groove of the receiving surface as a constant movement fulcrum.

2. A feeding method for a shaft-shaped component having a flange with a circular shape and a shaft portion that are integrated with each other, the feeding method comprising:

holding the shaft-shaped component at a tip portion of a feeding rod; and feeding the shaft-shaped component, so that the shaft portion of the shaft-shaped component is inserted into a receiving hole as a feeding destination, wherein an advance and retreat axis of the feeding rod is disposed in an inclined state with respect to a central axis of the receiving hole disposed in a substantially vertical direction, a central axis of the shaft portion is disposed in an inclined state with respect to the central axis of the receiving hole due to inclined disposition of the feeding rod, a surface of the flange is held by the feeding rod in close contact with a tip surface of the feeding rod by an attraction force of an advancing and retreating permanent magnet or electromagnet disposed in the feeding rod, an outer peripheral portion of the flange having an arc shape in a longitudinal section of the flange along the central axis of the shaft portion, the tip surface includes a positioning protrusion that receives the outer peripheral portion of the flange and sets a relative position between the feeding rod and the shaft-shaped component, the positioning protrusion being provided at a lowest position of the tip surface of the feeding rod due to inclination of the feeding rod, and the positioning protrusion having a receiving surface formed with a recessed groove to which the outer peripheral portion of the flange is fitted, an advance length of the feeding rod is set so that a most advanced stop position of the feeding rod is a position where a tip portion of the shaft portion has entered the receiving hole, the attraction force of the advancing and retreating permanent magnet or electromagnet is configured to be eliminated at the most advanced stop position, and when the attraction force is eliminated, the shaft-shaped component performs an initial arc movement with a contact position between the outer peripheral portion of the flange and the recessed groove of the receiving surface as a constant movement fulcrum, and subsequently a falling arc movement so that the shaft portion of the shaft-shaped component is inserted into the receiving hole.

* * * * *